(12) United States Patent
Park (10) Patent No.: US 11,620,650 B2
(45) Date of Patent: Apr. 4, 2023

(54) MOBILE AUTHENTICATION METHOD AND SYSTEM THEREFOR

(71) Applicant: HAREX INFOTECH INC., Seoul (KR)

(72) Inventor: Kyung Yang Park, Seoul (KR)

(73) Assignee: HAREX INFOTECH INC., Seoul (KR)

( * ) Notice: Subject to any disclaimer, the term of this patent is extended or adjusted under 35 U.S.C. 154(b) by 0 days.

(21) Appl. No.: 16/310,021

(22) PCT Filed: Jun. 16, 2017

(86) PCT No.: PCT/KR2017/006331
§ 371 (c)(1),
(2) Date: Dec. 14, 2018

(87) PCT Pub. No.: WO2017/217808
PCT Pub. Date: Dec. 21, 2017

(65) Prior Publication Data
US 2019/0180278 A1      Jun. 13, 2019

(30) Foreign Application Priority Data

Jun. 16, 2016  (KR) .................. 10-2016-0074947
Apr. 17, 2017  (KR) .................. 10-2017-0049278

(51) Int. Cl.
*G06Q 20/32* (2012.01)
*G06Q 20/38* (2012.01)
(Continued)

(52) U.S. Cl.
CPC .......... *G06Q 20/401* (2013.01); *G06F 21/31* (2013.01); *G06F 21/32* (2013.01); *G06F 21/45* (2013.01);
(Continued)

(58) Field of Classification Search
CPC .......... G06F 21/31; G06F 21/45; G06F 21/32; G06F 21/44; H04W 12/0602;
(Continued)

(56) References Cited

U.S. PATENT DOCUMENTS 7,610,056 B2 * 10/2009 Zapata .................. H04W 12/06
                                                                 455/410
9,047,444 B2   6/2015 Sherlock et al.
(Continued)

FOREIGN PATENT DOCUMENTS

CN   102971760 A    3/2013
EP   1 901 192 A1   3/2008
(Continued)

OTHER PUBLICATIONS

"What is Instance ID?," Jun. 2, 2016, retrieved from website https://web.archive.org/web/20160602190850if_/https://developers.google.com/instance-id/#instance_id_lifecycle (Year: 2016).*
(Continued)

*Primary Examiner* — Daniel S Felten
*Assistant Examiner* — Douglas W Pinsky
(74) *Attorney, Agent, or Firm* — Sughrue Mion, PLLC (57) ABSTRACT

According to one aspect of the present invention for accomplishing the aforementioned purpose, a mobile authentication method performed by a portable user device comprises the steps of extracting a telephone number of the portable user device, transmitting member information including the telephone number to an authentication server, receiving a user authentication number using the member information from the authentication server, extracting unique user identifiers (UUID) of an application (app) installed in the portable user device, and transmitting the extracted UUID of the app and the received user authentication number to a service server.

5 Claims, 6 Drawing Sheets

(51) Int. Cl.
| | |
|---|---|
| H04L 29/06 | (2006.01) |
| G06Q 20/10 | (2012.01) |
| G06F 16/23 | (2019.01) |
| G06Q 40/06 | (2012.01) |
| G06Q 20/40 | (2012.01) |
| H04W 4/14 | (2009.01) |
| G06F 21/45 | (2013.01) |
| G06F 21/31 | (2013.01) |
| G06Q 40/02 | (2012.01) |
| H04W 12/062 | (2021.01) |
| H04W 12/72 | (2021.01) |
| G06F 21/32 | (2013.01) |
| H04W 60/00 | (2009.01) |

(52) U.S. Cl.
CPC ........... *G06Q 20/326* (2020.05); *G06Q 20/40* (2013.01); *G06Q 40/02* (2013.01); *H04W 4/14* (2013.01); *H04W 12/062* (2021.01); *H04W 12/72* (2021.01); *H04W 60/00* (2013.01)

(58) Field of Classification Search
CPC . H04W 12/00514; H04W 60/00; H04W 4/14; G06Q 20/40; G06Q 40/02; G06Q 20/401; G06Q 20/425; G06Q 20/3255; G06Q 20/32; G06Q 20/386
See application file for complete search history.

(56) References Cited

U.S. PATENT DOCUMENTS

| | | | | |
|---|---|---|---|---|
| 2006/0002556 | A1* | 1/2006 | Paul | H04L 63/18 |
| | | | | 380/270 |
| 2009/0100181 | A1* | 4/2009 | Bengtsson | H04L 63/0838 |
| | | | | 709/229 |
| 2009/0328144 | A1* | 12/2009 | Sherlock | G06F 21/123 |
| | | | | 709/204 |
| 2012/0254602 | A1* | 10/2012 | Bhansali | G06F 21/31 |
| | | | | 713/2 |
| 2012/0302222 | A1* | 11/2012 | Williamson | H04W 4/24 |
| | | | | 455/418 |
| 2014/0026196 | A1* | 1/2014 | Hayat | G06F 21/44 |
| | | | | 726/4 |
| 2014/0032415 | A1 | 1/2014 | Lee et al. | |
| 2014/0123319 | A1* | 5/2014 | Porjo | H04L 63/10 |
| | | | | 726/28 |
| 2014/0355592 | A1* | 12/2014 | Camps | H04W 4/023 |
| | | | | 370/338 |
| 2015/0213238 | A1* | 7/2015 | Farha | H04L 63/101 |
| | | | | 726/30 |
| 2016/0210634 | A1* | 7/2016 | Trujillo | G06Q 20/3224 |
| 2017/0063975 | A1* | 3/2017 | Prakash | H04L 67/1001 |
| 2017/0303111 | A1* | 10/2017 | Kohli | H04W 12/10 |

FOREIGN PATENT DOCUMENTS

| | | | |
|---|---|---|---|
| KR | 100522539 | B1 * | 10/2005 |
| KR | 20040062715 | A * | 10/2005 |
| KR | 10-2010-0124998 | A | 11/2010 |
| KR | 10-2013-0084727 | A | 7/2013 |
| KR | 10-2013-0103917 | A | 9/2013 |
| KR | 10-2014-0145507 | A | 12/2014 |
| WO | 2008/032010 | A2 | 3/2008 |

OTHER PUBLICATIONS

"Limit Use of UUID," Mar. 13, 2016, retrieved from website https://books.nowsecure.com/secure-mobile-development/en/sensitive-data/limit-use-of-uuid.html (Year: 2016).*

"MSISDN—Computer Definition," Sep. 22, 2015, retrieved from websitehttps://web.archive.org/web/20150922070529/https://www.yourdictionary.com/msisdn (Year: 2015).*

P. Leach et al., "RFC 4122: A Universally Unique IDentifier (UUID) URN Namespace," Jul. 2005, Proposed Standard, Network Working Group, The Internet Society, retrieved from: https://tools.ietf.org/html/rfc4122 (Year: 2005).*

International Search Report for PCT/KR2017/006331 dated Sep. 19, 2017 [PCT/ISA/210].

* cited by examiner

MOBILE AUTHENTICATION METHOD AND SYSTEM THEREFOR

CROSS REFERENCE TO RELATED APPLICATIONS

This application is a National Stage of International Application No. PCT/KR2017/006331, filed on Jun. 16, 2017, which claims priority from Korean Patent Application No. 10-2016-0074947, filed on Jun. 6, 2016, and Korean Patent Application No. 10-2017-0049278, filed on Apr. 17, 2017.

TECHNICAL FIELD

The present invention relates to a mobile authentication method and a system therefor, and more particularly, to an authentication method for performing self-verification and a financial transaction, such as a payment, using a phone number of a portable device extracted using a short message service (SMS) message of the portable device and unique user identifiers (UUID) of an application (app) installed on the portable device and a system therefor.

BACKGROUND ART

Due to the recent prevalence of smart phones, various financial transaction services, such as a payment or an account transaction, are being provided through smart phone apps. In addition to financial transaction services, various services which require authentication are being used through smart phone apps.

In the case of a financial transaction, self-verification or authentication of a portable device is important. Therefore, authentication is frequently performed using a certificate, an automatic response system (ARS), an SMS, and the like. However, a financial transaction involves a troublesome procedure, such as inputting a password of a certificate in every transaction or making a phone call to an ARS and inputting a temporary self-verification number, receiving an SMS message, and inputting a self-verification number included in the SMS message.

Since anyone can easily create and distribute smart phone apps, various apps are being created and used. While users can easily use all services, such as financial transaction services, in smart phones, apps are highly likely to be tampered because anyone can create and distribute apps.

Also, when a smart phone is hacked and an app is copied or a smart phone is copied and used, personal information or financial transaction information may be leaked.

DISCLOSURE

Technical Problem

The present invention has been developed from the aforementioned technical background and is directed to providing a portable device authentication method for preventing copying or misuse of an app by performing self-verification and app authentication with a self-verification number, which is generated on the basis of membership information including a phone number of a portable device, and UUID of the app and a system therefor.

The present invention is also directed to providing a method of extracting a phone number of a portable device through an SMS server and using the extracted phone number for security when it is not possible to extract the phone number due to policy limitations and the like of a portable device manufacturer.

Objectives of the present invention are not limited to the aforementioned objectives, and other objectives which have not been mentioned will be clearly understood by those of ordinary skill in the art from the following description.

Technical Solution

One aspect of the present invention provides a mobile authentication method including: extracting a phone number of a portable user device; transmitting membership information including the phone number to an authentication service provider server for subscriber authentication; receiving a self-verification number from the authentication service provider server using the membership information; extracting UUID of an app installed on the portable user device and transmitting the extracted UUID of the app and the received self-verification number to a service server; and receiving a serial number of the app, which is generated in correspondence with the self-verification number and the UUID of the app received by the service server, from the service server.

Another aspect of the present invention provides a mobile payment system including: a portable user device configured to receive a self-verification number by transferring membership information including a phone number to an authentication service provider server and receive a serial number of an installed app by transferring UUID of the app and the self-verification number to a service server; the authentication service provider server configured to receive the membership information, performs membership authentication using the phone number included in the membership information, and transmit the self-verification number to the portable user device after authentication; and the service server configured to generate the serial number of the app using the UUID of the app and the self-verification number received from the portable user device, store the generated serial number of the app, and transmit the generated serial number of the app to the portable user device.

Advantageous Effects

According to the present invention, self-verification and authentication of a financial transaction app are performed together using membership information including a phone number of a portable user device and UUID of the financial transaction app. Therefore, security of a mobile financial transaction can be strengthened, and it is possible to prevent the financial transaction app from being copied and misused. Consequently, it is possible to prevent economic loss caused by leakage of financial information and the like.

In addition, even when it is not possible to extract a phone number of a portable device due to policy limitations and the like of the portable device manufacturer, the phone number can be extracted through an external device, such as an SMS server, and used for security.

MODES OF THE INVENTION

Advantages and features of the present invention and methods for accomplishing the same will be more clearly understood from embodiments described in detail below with reference to the accompanying drawings. However, the present invention is not limited to the embodiments set forth herein but may be implemented in various different forms. The embodiments are provided only to complete disclosure of the present invention and to fully convey the scope of the invention to those of ordinary skill in the technical field to which the present invention pertains, and the present invention is defined by only the scope of the claims. Meanwhile, terms used in this specification are for describing the embodiments rather than limiting the present invention. In this specification, singular forms include plural forms unless expressly stated otherwise. As used herein, the word "comprises" and/or "comprising" do not preclude the presence or addition of one or more elements, steps, operations and/or devices other than stated elements, steps, operations and/or devices.

Hereinafter, exemplary embodiments of the present invention will be described in detail with reference to the accompanying drawings. For description convenience and improved understanding of each embodiment, a financial transaction app will be described as an example. However, the present invention is not limited to a financial transaction app and may be applied to various kinds of apps which require authentication.

Figure 1:
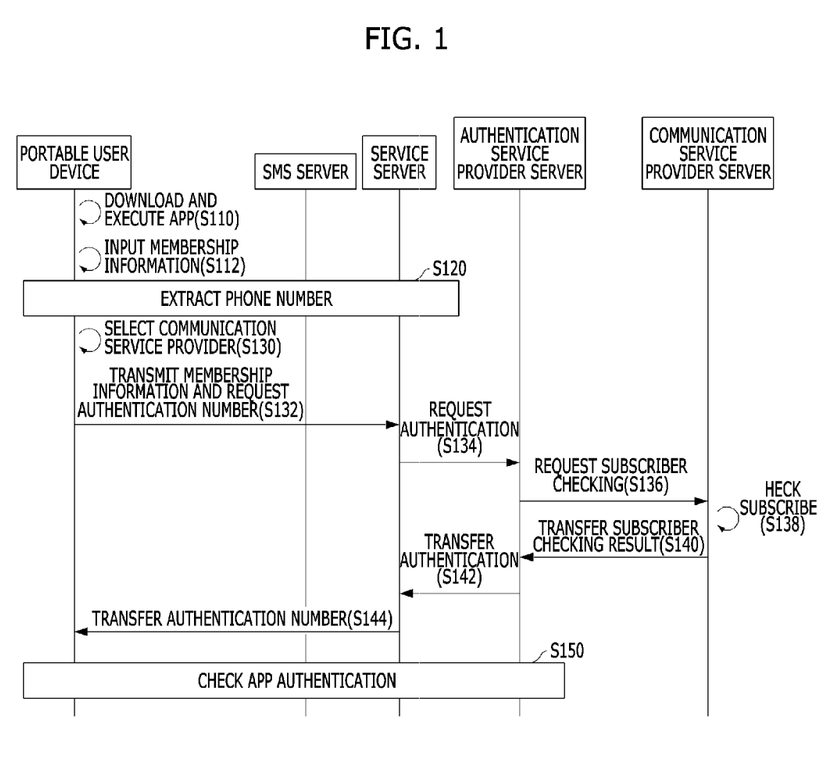
FIG. 1 is a sequence diagram of an authentication method for a mobile financial transaction according to an embodiment of the present invention.

FIG. 1 is a sequence diagram of a self-verification method according to an embodiment of the present invention.

Self-verification of FIG. 1 corresponds to a user information registration step for authentication according to the present invention.

When a financial transaction app is downloaded and run for a financial transaction such as a payment or an account transaction (S110), a user agrees to clauses for financial transactions and input membership information, such as a user name and birthdate, local or foreigner, and male or female (S112).

Subsequently, a step for extracting a phone number of a portable device is performed (S120).

When an operating system (OS) of the portable device provides a phone number of the portable device like Android of Google, it is possible to simply extract the phone number from device information of the portable device through the OS.

However, when the OS does not provide device information, such as the phone number of the portable device, like iOS used in iPhones, it is possible to extract the phone number using an SMS.

After acquiring the phone number through the phone number extraction process (S120), the portable device acquires information of a communication service provider through an input of the user's selection (S130) and transmits the phone number to a service server together with the already input membership information such as the name and birthdate (S132).

The service server requests authentication by transferring the received information to an authentication service provider server (S134). The membership information including the phone number may be transmitted directly to the authentication service provider server not through the service server.

When the authentication service provider server requests subscriber checking by transmitting the received membership information including the phone number to the communication service provider server (S136), the communication service provider server performs subscriber checking by comparing the membership information including the phone number with subscriber information (S138) and notifies the authentication service provider server of the result (S140).

When subscriber checking is finished, the authentication service provider server notifies the service server that the authentication has succeeded by generating and transmitting a self-verification number to the service server (S142), and the service server transfers the self-verification number to the portable terminal of the user (S144). The self-verification number may be transferred from the authentication service provider server directly to the portable terminal of the user not through the service server.

When self-verification is performed as described above, app authentication is performed in succession. The portable user device which receives the self-verification number is additionally subjected to checking of financial app authentication using the phone number and UUID of the financial transaction app (S150) so that a financial transaction service may proceed with strengthened security.

A method of extracting a phone number of a portable user device when a portable device OS restricts or does not support extraction of a phone number like iOS will be described in detail below, and app authentication using an extracted phone number and app UUID will be described in succession.

Figure 2:
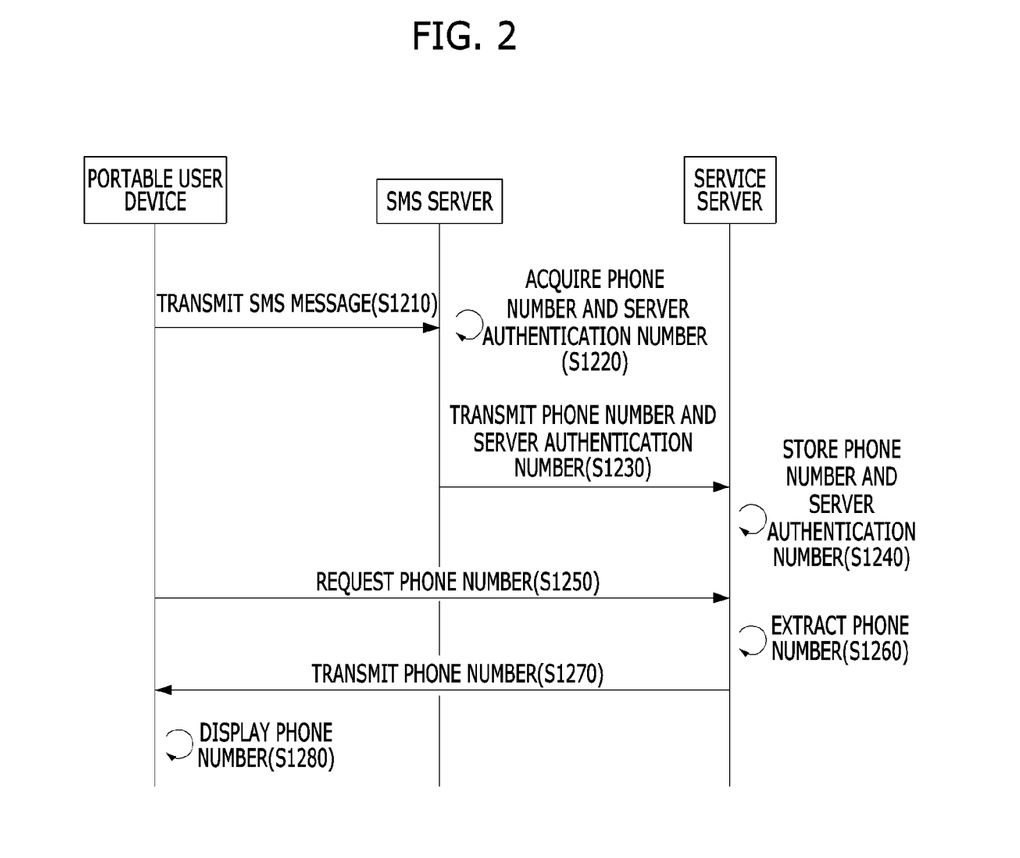
FIG. 2 is a sequence diagram of a phone number extraction method according to an embodiment of the present invention.

FIG. 2 is a sequence diagram of a phone number extraction method.

The portable device transmits an SMS message including a server authentication number (an index for the service server to check and manage the phone number of the portable device) generated by the financial transaction app to an SMS server (S1210).

When the SMS message transmitted from the portable device is received, the SMS server extracts and acquires the server authentication number and the phone number which is automatically included and transferred in the SMS message (S1220) and transmits the server authentication number and the phone number to the service server (S1230). The service server stores the received phone number of the portable device and the server authentication number together (S1240). In other words, the phone number of the portable device and the server authentication number are stored in association with each other.

The SMS message passes through the SMS server, and in this process, the phone number of the portable device is automatically checked. Therefore, it is possible to prevent forgery of a phone number caused when a portable device operator (e.g., a stealer) and the like inputs a phone number by mistake, and it is possible to detect a phone number even in a portable device, such as an iPhone, from which device information is not acquired.

The portable device requests the phone number by transmitting the server authentication number to the service server (S1250). The service server compares the server authentication number received from the portable device with stored server authentication numbers and extracts a phone number corresponding to a server authentication number which coincides with the received server authentication number (S1260).

The service server transmit the phone number to the portable user device using the extracted phone number (S1270) so that the phone number of the portable device may be prevented from being forged. Meanwhile, the portable device receiving the phone number may be configured to automatically display the received phone number therein so that the user may be notified that the phone number has been successfully extracted (S1280).

Meanwhile, step S1260 may be omitted, and when the service server acquires the phone number of the portable device in step S1240, the process may directly proceed to step S1280 so that the phone number may be transferred to the portable device.

The above-described process may be performed in a manner in which a portable device transmits an SMS message to a service provider, an SMS server transfers the SMS message transmitted by the portable device to a service server or another server managed by a service provider, and the service server or the other server extracts a phone number. In this case, no server authentication number may be required.

According to such a phone number extraction method, unlike a conventional method in which a user personally inputs a phone number of a portable device and requests a self-verification number from an authentication service provider server, a phone number is automatically extracted by an SMS server so that forgery of the phone number may be prevented.

Figure 3:
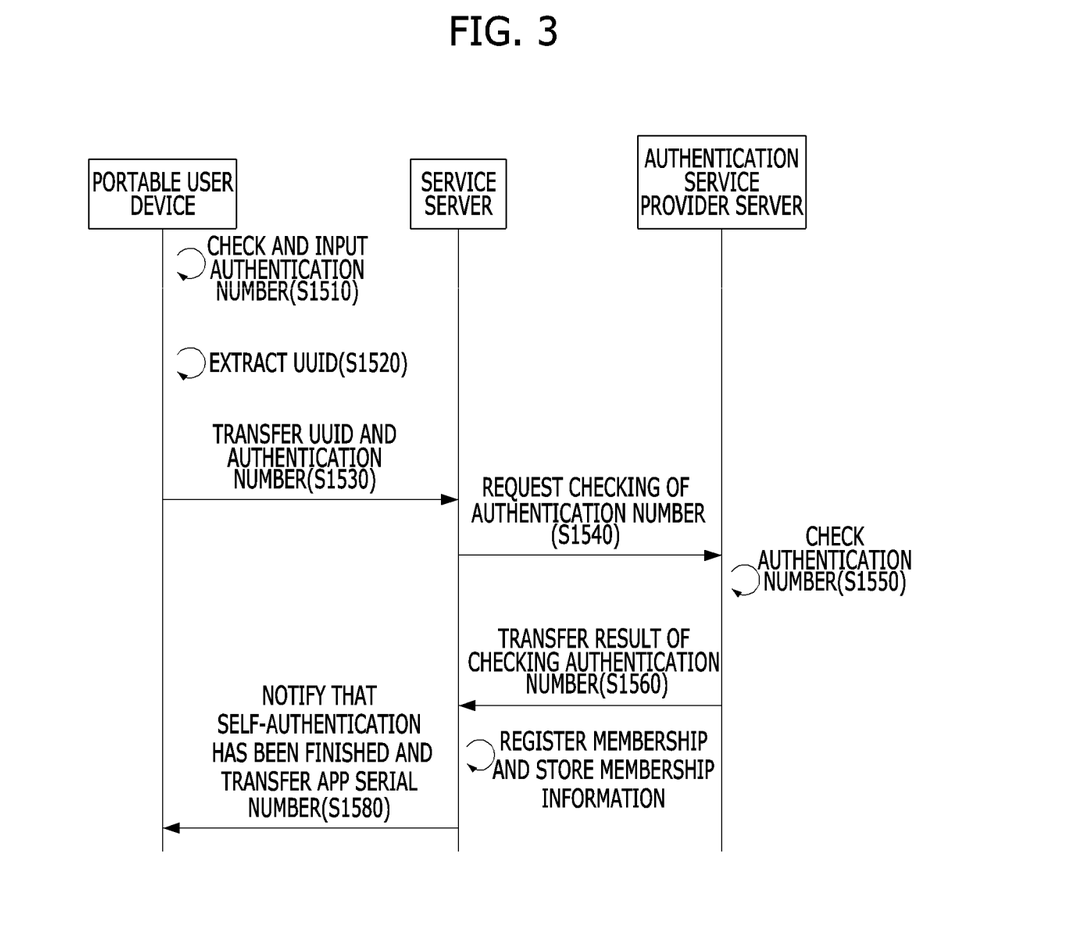
FIG. 3 is a sequence diagram of a method of checking authentication of a financial transaction app using UUID of the app according to an embodiment of the present invention.

FIG. 3 is a sequence diagram of a method of checking authentication of a financial transaction app using UUID of the app according to an embodiment of the present invention. When the user checks the self-verification number received by the portable device and inputs the self-verification number (S1510), the portable device extracts UUID of the financial transaction app through the OS (S1520). Since the portable user device has received and stored the self-verification number already, it is obvious for those of ordinary skill in the art that a procedure for checking UUID of the app may be performed without an input of the user.

UUID are IDs which are given by an app storage, such as App Store, when an app is downloaded from the app storage. Every time an individual downloads an app, different UUID are given to the app, and the given UUID are stored not in the app but in an OS of a portable device to which the app has been downloaded. Therefore, even when the app is copied, the UUID are not copied. Consequently, it is possible to prevent tampering of the app.

When the UUID of the financial transaction app, the self-verification number, and the phone number of the portable terminal are transferred to the service server (S1530), the service server requests checking of the self-verification number by transferring the self-verification number and the phone number to the authentication service provider server (S1540).

The authentication service provider server authenticates whether the user (a person who has the portable device) coincides with the subscriber by comparing the self-verification number generated for phone number authentication and the phone number with the self-verification number and the phone number received from the service server in step S1540 (S1550). In other words, it is possible to check whether the UUID are UUID transferred from the portable terminal which has requested generation of a self-verification number in steps S110 to S144 (possession authentication).

The authentication service provider server notifies the service server of the authentication result (S1560), and the service server determines that the self-verification has been finished and then registers membership information for providing a financial transaction service (S1570). The registered membership information includes the phone number of the portable device, the birthdate, local or foreigner, male or female, and the UUID of the financial transaction app.

Meanwhile, when the self-verification is finished, the service server may additionally generate an app serial number and store and manage the app serial number together with the self-verification number, the app UUID, and/or the phone number of the portable device. After that, the service server may use the app serial number to check the authentication result. When self-verification and membership information registration are finished, the service server notifies the portable device of the user that a self-verification and registration procedure has been finished and also transfers the generated serial number of the financial transaction app (S1580) so that the serial number may be stored in the portable user device and then used for authentication when the financial transaction app is executed.

Meanwhile, it has been described above that the service server and the authentication service provider server are separate servers, but the service server and the authentication service provider server may be implemented as one server and maintained by one service provider. In this case, it is unnecessary to exchange data between the service server and the authentication service provider server.

Figure 4:
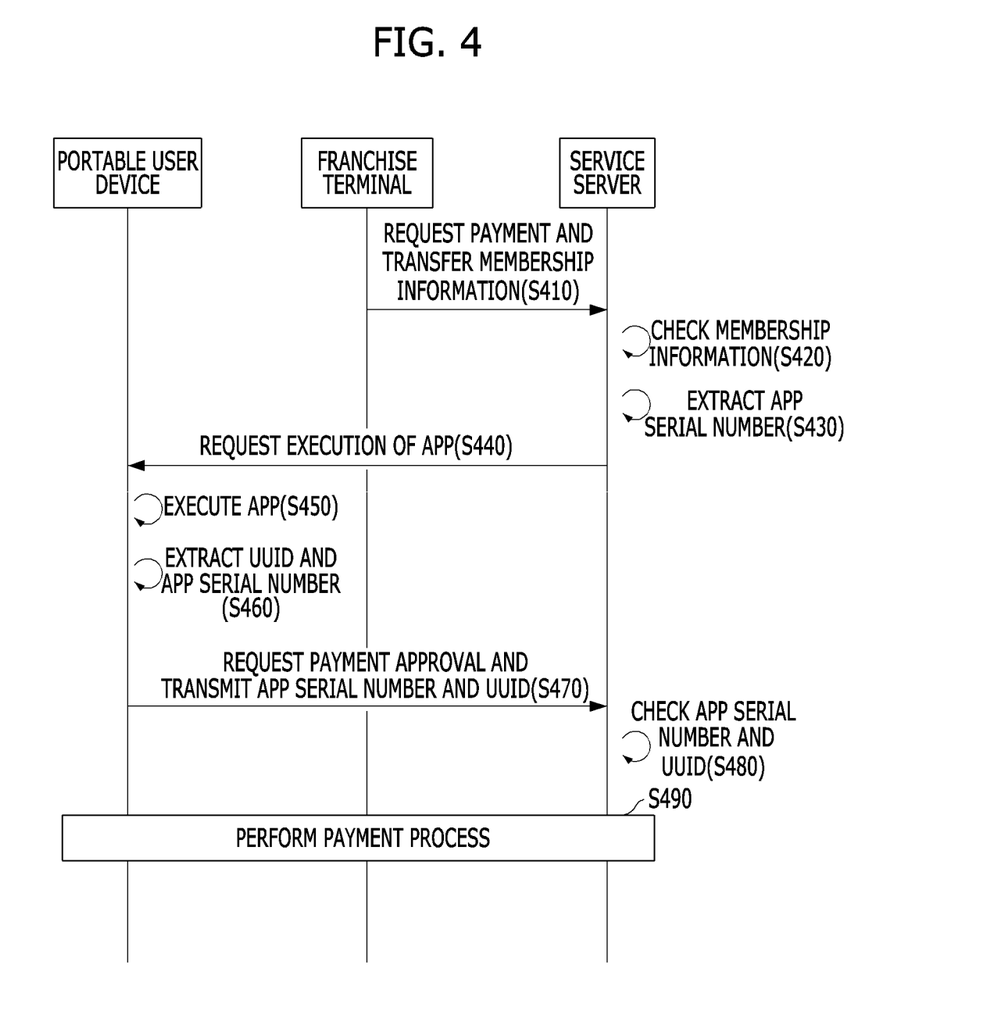
FIG. 4 is a sequence diagram of a financial transaction method employing a financial transaction app which has been authenticated according to an embodiment of the present invention.

After the above self-verification and authentication of the financial transaction app are finished, a financial transaction of the user is performed using the financial transaction app whose authentication has been finished. FIG. 4 is a sequence diagram showing a method of performing a financial transaction using a financial transaction app after authentication is finished.

When there is a payment request of the user, a franchise owner transmits the amount of payment, the phone number of the portable user device and the birthdate information of the user to the service server which provides a secured financial transaction through a franchise device (S410).

When the payment of the user is made online through the portable device, the amount of payment, the phone number and the birthdate information may be transmitted from the portable device of the user to the service server.

The service server determines whether the user is a member by comparing the phone number and the birthdate information received from the franchise device with the phone number and the birthdate in the membership information which has been stored in a database during a membership registration process (S420). When it is determined that the user is a member, the service server extracts the previously stored serial number of the financial transaction app using the phone number (S430).

The service server requests the portable user device to execute the financial transaction app in a push manner using the user's phone number received from the franchise device (S440). In response to this, the portable user device executes the financial transaction app (S450). A plurality of financial transaction apps may be installed on the portable device. In this case, it is possible to distinguish an app whose execution will be requested in a push manner using an app-specific identifier (app ID). Every time an app is installed on the portable device, the service server generates or acquires and stores an app ID and manages the app ID.

To prevent misuse of the portable user device such as theft or loss, a step of receiving a password or biometric information, such as a fingerprint or a signature, from a user may be added when the app is executed.

The executed financial transaction app extracts the UUID thereof through the OS, extracts the serial number thereof which has been received from the service server and stored during a self-verification process (S460), and transfers the UUID and the serial number thereof to the service server to authenticate a financial transaction (S470).

The service server determines whether the app has been tampered by comparing the received UUID and app serial number with the UUID and the serial number of the financial transaction app in the membership information which is stored in the database when membership registration and self-verification are finished (S480).

Security may be further strengthened by using not only the aforementioned phone number and birthdate but also the serial number and the UUID of the financial transaction app for financial transaction authentication. The serial number or the UUID of the financial transaction app is not personally input by the user, but rather the serial number or the UUID stored in the portable device and the service server is used. Therefore, it is also possible to minimize the user's inconvenience caused by strengthened security.

When authentication of the financial transaction app is finished in this way, a financial transaction is possible in various ways in which a general payment service is provided (S490).

Meanwhile, the portable device may transfer only one of the app serial number and the app UUID to the service server, and the service server may determine whether the app has been tampered using the app UUID or the app serial number. However, when the app serial number and the app UUID are used together, it is possible to detect universal subscriber identity module (USIM) replacement, app dump, illegal app copying, etc. by analyzing the information together with a phone number, and thus security is further strengthened. Therefore, it is preferable to use the app serial number and the app UUID together.

Figure 5:
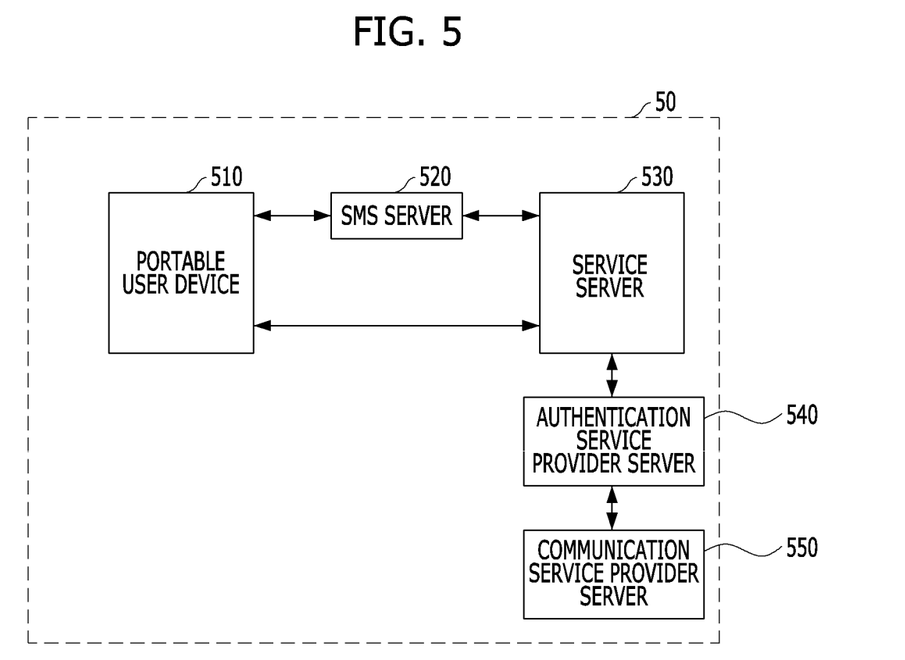
FIG. 5 is a structure diagram of a mobile payment system according to another embodiment of the present invention.

FIG. 5 shows a system 50 for self-verification and financial transaction app authentication according to an exemplary embodiment of the present invention.

The system 50 includes a portable user device 510, an SMS server 520, a service server 530, an authentication service provider server 540, and a communication service provider server 550.

The portable user device 510 transfers a phone number and a server authentication number by transmitting an SMS message to the SMS server through the above-described process, receives the phone number from the service server 530 which receives the phone number and the server authentication number from the SMS server, and displays the received phone number on a screen.

In addition to the method employing an SMS, the portable user device 510 may use a method of directly extracting the phone number from an OS thereof.

According to the present invention, self-verification may be performed using the phone number received from the service server 530 or directly extracted from the portable user device 510 and a self-verification number received from the authentication service provider server 540, and a financial transaction app is authenticated by the service server 530 using an UUID and a serial number of the financial transaction app in order to determine whether the app installed on the portable device 510 has been tampered so that a financial transaction may be performed.

The SMS server 520 acquires the phone number of the portable device 510 from the SMS message received from the portable device 510 of a user and causes the phone number to be transferred to the portable device 510 by transferring the phone number to the service server 530, thereby serving to extract the phone number from the portable device 510, such as iPhones, in which access to the OS is restricted.

The service server 530 transfers the phone number to the portable user device 510 using the phone number and the server authentication number received from the SMS server 520, registers membership information of the user for a financial transaction service and generates and transfers a serial number of the financial transaction app to the portable device 510 so that self-verification and authentication of the financial transaction app may be performed.

Also, when there is a payment request of a franchise terminal (not shown), the service server 530 causes the financial transaction app of the portable user device 510 to be executed in a push manner, receives the serial number and the UUID of the financial transaction app from the portable device 510, and determines whether the financial transaction app has been tampered by comparing the received serial number and the UUID with a serial number and UUID of the financial transaction app stored in a database so that a financial transaction process such as a payment may be performed.

The authentication service provider server 540 generates a self-verification number for self-verification. The authentication service provider server 540 requests subscriber checking from the communication service provider server 550 using the membership information which is received from the service server 530 and includes the phone number. When the communication service provider server 550 checks subscription information and notifies the authentication service provider server 540 of the result, the authentication service provider server 540 generates and transfers a self-verification number to the portable device 510 so that self-verification may be performed.

The communication service provider server 550 performs subscriber checking by comparing user information received from the authentication service provider server 540 with subscriber information stored in a database of the communication service provider server 550 and transfers the result to the authentication service provider server 540 so that self-verification may be performed.

Meanwhile, the service server may function as the SMS server 520 and the authentication service provider server 540.

Since the above-described system may prevent app tampering, a safe financial transaction is possible.

Figure 6:
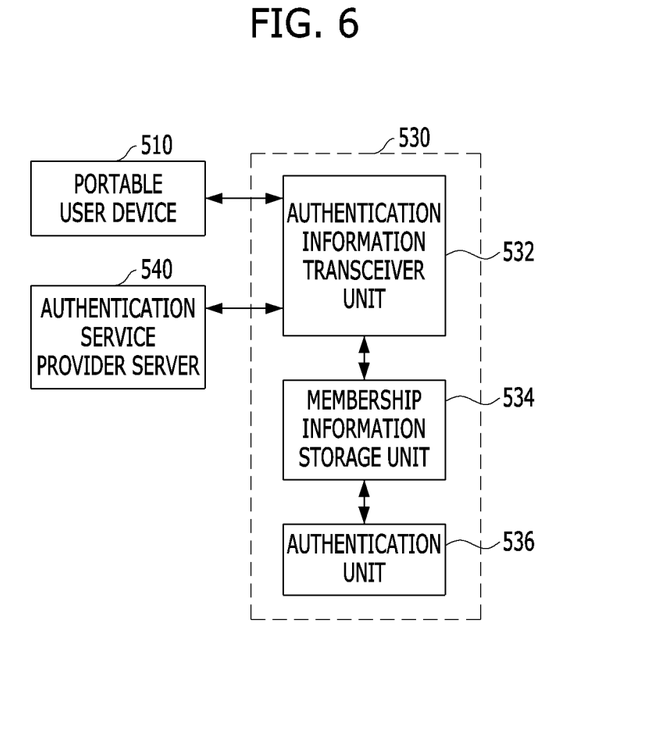
FIG. 6 is a structure diagram of a service server which performs authentication according to another embodiment of the present invention.

FIG. 6 is a structure diagram of the service server 530 which performs user authentication according to another embodiment of the present invention.

The service server 530 includes an authentication information transceiver unit 532, a membership information storage unit 534, and an authentication unit 536.

The authentication information transceiver unit 532 exchanges information required for user authentication with the portable user device 510 and the authentication service provider server 540.

First, the authentication information transceiver unit 532 receives membership information including a phone number from the portable user device 510 and transmits the received membership information to the authentication service provider server 540. The authentication information transceiver unit 532 receives a result of user checking, which is performed by the authentication service provider server 540 using the membership information, together with a self-verification number and transmits the result and the self-verification number to the portable user device 510.

The membership information storage unit 534 stores membership information required for authentication.

The membership information storage unit 534 stores the membership information including the phone number and received from the portable user device 510 and stores a self-verification number received from the authentication service provider server 540.

When user authentication succeeds with the self-verification number, UUID received from the portable user device 510 and an app serial number which is generated in correspondence with the UUID are stored in the membership information storage unit 534.

Finally, the authentication unit 536 performs user authentication by comparing the self-verification number received from the portable user device 510 and the self-verification number received and stored from the authentication service provider server 540.

Also, when an app serial number and/or UUID are received from the portable user device 510 together with a payment request, the authentication unit 536 performs app authentication in which an app is verified by comparing the received app serial number and/or UUID with the app serial number and/or the UUID stored in the membership information storage unit 534, in a payment step.

By simultaneously using user authentication and app authentication, it is possible to further strengthen security of a financial transaction in a mobile environment.

Although configurations of the present invention have been described in detail above with reference to the accompanying drawings, these are mere examples, and those of ordinary skill in the technical field to which the present invention pertains can make various modifications and changes within the technical spirit of the present invention. For example, since it is possible to uniquely identify a specific app installed on a specific portable device with only UUID, the technical spirit of the present invention includes a configuration in which an app serial number is not used in user authentication and/or payment and a configuration in which any password or biometric information instead of a birthdate is stored in a service server and used for a payment. Therefore, the scope of the present invention should not be limited by the above-described embodiments but should be determined by the following claims.

The invention claimed is:

1. A mobile authentication and registration method performed in a portable device, the method comprising:
   downloading an application (app) from an app storage to the portable device, wherein the app, when installed on the portable device, is used to perform a transaction;
   extracting a phone number of the portable device from an operating system (OS) of the portable device based on the OS of the portable device supporting extraction of the phone number;
   extracting the phone number of the portable device by performing the following operations based on the OS of the portable device not supporting extraction of the phone number:
   generating a server authentication number to authenticate the portable device, by using the app, and transmitting a short message service (SMS) message including the server authentication number to an SMS server, wherein the server authentication number is an index for a service server to check and manage the phone number of the portable device, and wherein the server authentication number and the phone number of the portable device included in the SMS message are forwarded to the service server such that the phone number of the portable device and the server authentication number are stored in the service server in association with each other;
   subsequent to the transmitting of the SMS message to the SMS server, transmitting to the service server without passing through the SMS server, a request for the phone number of the portable device, the request including the server authentication number; and
   receiving, from the service server, a phone number that is stored in the service server in association with a matched one of a plurality of server authentication numbers stored in the service server, the matching comprising a matching, by the service server, between the server authentication number, transmitted from the portable device to the service server without passing through the SMS server, with the one of the plurality of server authentication numbers stored in the service server;
   transmitting membership information, including the phone number received from the service server, to an authentication server;
   receiving a self-verification number, which is a result of performing self-verification with the membership information, from the authentication server;
   extracting a unique user identifier (UUID) of the app, wherein the UUID is given by the app storage when the app is downloaded from the app storage, and different UUIDs are given each time the app is downloaded from the app storage;
   storing the UUID not in the app but in the OS of the portable device;
   transmitting the extracted UUID, the extracted phone number, and the received self-verification number to the service server;
   receiving, from the service server, a self-verification number checking result, which is obtained by transmitting the self-verification number and the phone number received by the service server to the authentication server, wherein the membership information includes the UUID and is registered with the service server;
   executing the app;
   upon executing the app, extracting the UUID via the OS and transmitting the extracted UUID to the service server to authenticate a transaction to be performed by using the app, wherein the authenticating the transaction by the service server comprises determining that there is a match between the UUID included in the membership information registered with the service server and the UUID extracted upon executing the app; and
   performing the transaction by using the app, based on the authenticating by the service server.

2. The mobile authentication and registration method of claim 1, wherein the receiving the self-verification number checking result comprises:
   receiving, from the service server, a serial number of the app and storing the serial number in the portable device, the serial number being generated based on the ULM of the app and the self-verification number and included in the membership information.

3. The mobile authentication and registration method of claim 2, further comprising, upon executing the app, extracting the serial number of the app and transmitting the serial number of the app to the service server, and wherein the performing the transaction is further based on a determination by the service server that there is a match between the serial number of the app extracted upon executing the app and the serial number of the app included in the membership information.

4. The mobile authentication and registration method of claim 1, wherein the executing the app comprises:

receiving, from the service server, a request to execute the app in a push manner using the phone number of the portable device, and executing the app in response to the request.

5. The mobile authentication and registration method of claim 4, wherein the request to execute the app in the push manner includes an app-specific identifier (app ID).

\* \* \* \* \*